United States Patent
Priedeman, Jr.

(10) Patent No.: US 11,220,062 B2
(45) Date of Patent: Jan. 11, 2022

(54) WATER-DISPERSIBLE THERMOPLASTIC MATERIAL COMPRISING SULFONATED COPOLYMER FOR USE IN ADDITIVE MANUFACTURING

(71) Applicant: Stratasys, Inc., Eden Prairie, MN (US)

(72) Inventor: William R. Priedeman, Jr., Long Lake, MN (US)

(73) Assignee: Stratasys, Inc., Eden Prairie, MN (US)

( * ) Notice: Subject to any disclaimer, the term of this patent is extended or adjusted under 35 U.S.C. 154(b) by 55 days.

(21) Appl. No.: 16/643,275

(22) PCT Filed: Oct. 10, 2018

(86) PCT No.: PCT/US2018/055277
§ 371 (c)(1),
(2) Date: Feb. 28, 2020

(87) PCT Pub. No.: WO2019/075107
PCT Pub. Date: Apr. 18, 2019

(65) Prior Publication Data
US 2020/0207025 A1 Jul. 2, 2020

Related U.S. Application Data

(60) Provisional application No. 62/570,283, filed on Oct. 10, 2017.

(51) Int. Cl.
| | |
|---|---|
| B29C 64/40 | (2017.01) |
| C08F 212/14 | (2006.01) |
| B33Y 10/00 | (2015.01) |
| B33Y 70/00 | (2020.01) |

(52) U.S. Cl.
CPC ............ *B29C 64/40* (2017.08); *C08F 212/30* (2020.02); *B33Y 10/00* (2014.12); *B33Y 70/00* (2014.12)

(58) Field of Classification Search
CPC ..................................................... B29C 64/40
See application file for complete search history.

(56) References Cited

U.S. PATENT DOCUMENTS

| | | | |
|---|---|---|---|
| 2,696,482 | A | 12/1954 | Pease |
| 3,296,204 | A | 1/1967 | Caldwell |
| 3,779,993 | A | 12/1973 | Kibler et al. |
| 4,304,901 | A | 12/1981 | O'Neill et al. |

(Continued)

FOREIGN PATENT DOCUMENTS

| | | |
|---|---|---|
| CA | 3052023 A1 | 8/2018 |
| CN | 107206673 A | 2/2015 |

(Continued)

OTHER PUBLICATIONS

Communication pursuant to Rules 161(1) and 162 EPC from European Patent Application No. 19797448.8, dated May 19, 2021, 3 pages.

(Continued)

*Primary Examiner* — Larry W Thrower
(74) *Attorney, Agent, or Firm* — Peter J. Ims; Westman, Champlin & Koehler, P.A.

(57) ABSTRACT

A water-dispersible addition-type sulfonated thermoplastic copolymer material for use as a consumable feedstock additive manufacturing, wherein the water-dispersible thermoplastic copolymer is a reaction product of an addition-type reaction of a metal sulfonated monomer, the water-dispersible sulfonated thermoplastic copolymer being dispersible in tap water in less than one hour.

20 Claims, 3 Drawing Sheets

(56) References Cited

U.S. PATENT DOCUMENTS

| | | |
|---|---|---|
| 4,801,388 A | 1/1989 | Fong et al. |
| 4,931,510 A | 6/1990 | Sackmann et al. |
| 5,369,210 A | 11/1994 | George et al. |
| 5,503,785 A | 4/1996 | Crump et al. |
| 5,679,754 A | 10/1997 | Larson et al. |
| 6,004,124 A | 12/1999 | Swanson et al. |
| 6,067,480 A | 5/2000 | Stuffle et al. |
| 6,070,107 A | 5/2000 | Lombardi et al. |
| 6,228,923 B1 | 5/2001 | Lombardi et al. |
| 6,437,034 B2 | 8/2002 | Lombardi et al. |
| 6,547,995 B1 | 4/2003 | Comb |
| 6,645,412 B2 | 11/2003 | Priedeman, Jr. |
| 6,680,364 B1 | 1/2004 | Linemann |
| 7,122,246 B2 | 10/2006 | Comb et al. |
| 7,384,255 B2 | 6/2008 | LaBossiere et al. |
| 7,604,470 B2 | 10/2009 | LaBossiere et al. |
| 7,625,200 B2 | 12/2009 | Leavitt |
| 7,896,209 B2 | 3/2011 | Batchelder et al. |
| 8,153,182 B2 | 4/2012 | Comb et al. |
| 8,488,994 B2 | 1/2013 | Hanson et al. |
| 8,419,996 B2 | 4/2013 | Swanson et al. |
| 8,647,102 B2 | 2/2014 | Swanson et al. |
| 8,879,957 B2 | 11/2014 | Hanson et al. |
| 8,926,882 B2 | 1/2015 | Batchelder et al. |
| 9,399,691 B2 | 7/2016 | Ruggieri et al. |
| 9,423,756 B2 | 8/2016 | Hanson et al. |
| 9,557,661 B2 | 1/2017 | Martin |
| 9,777,090 B2 | 10/2017 | Ruggieri et al. |
| 10,100,168 B2 | 10/2018 | Bayer et al. |
| 10,308,743 B2 | 6/2019 | Ruggieri et al. |
| 2005/0004282 A1 | 1/2005 | Priedeman et al. |
| 2013/0077996 A1 | 3/2013 | Hanson et al. |
| 2013/0077997 A1 | 3/2013 | Hanson et al. |
| 2013/0186549 A1 | 7/2013 | Comb et al. |
| 2013/0186558 A1 | 7/2013 | Comb et al. |
| 2013/0192779 A1 | 8/2013 | Parker et al. |
| 2015/0024316 A1 | 1/2015 | Orrock et al. |
| 2017/0022341 A1 | 1/2017 | Bayer et al. |
| 2017/0232684 A1 | 8/2017 | Yoshimura et al. |
| 2017/0240675 A1 | 8/2017 | Yoshirmura et al. |
| 2017/0369622 A1 | 12/2017 | Inouble et al. |
| 2018/0009160 A1 | 1/2018 | Sawada et al. |
| 2018/0030234 A1 | 2/2018 | Priedeman, Jr. |
| 2018/0043627 A1 | 2/2018 | Barclay et al. |
| 2018/0050495 A1 | 2/2018 | Stolyarov et al. |
| 2018/0142077 A1 | 5/2018 | Kimura et al. |

FOREIGN PATENT DOCUMENTS

| | | |
|---|---|---|
| CN | 104520484 A | 4/2015 |
| EP | 0 659 771 A1 | 6/1995 |
| EP | 0 728 767 A1 | 8/1996 |
| EP | 3689585 A1 | 8/2020 |
| GB | 717840 A | 11/1954 |
| GB | 1066188 | 2/1966 |
| JP | 2008507619 A | 3/2008 |
| JP | 2013247177 A | 12/2013 |
| JP | 2014040085 A | 3/2014 |
| JP | 2017030346 A | 2/2017 |
| KR | 10-2014-0119785 A | 10/2014 |
| WO | 2006020279 A2 | 2/2006 |
| WO | 2006020279 A3 | 2/2006 |
| WO | 2010045147 A2 | 4/2010 |
| WO | 2012143182 A1 | 10/2012 |
| WO | 2014072147 A1 | 5/2014 |
| WO | 2015/175682 A1 | 11/2015 |
| WO | 2016059986 A1 | 4/2016 |
| WO | 2016185874 A1 | 11/2016 |
| WO | 2016205690 A1 | 12/2016 |
| WO | 2017112687 A1 | 6/2017 |
| WO | 2017167691 A1 | 10/2017 |
| WO | 2020077127 A1 | 4/2020 |

OTHER PUBLICATIONS

International Search Report and Written Opinion dated Oct. 4, 2016 for corresponding International Application No. PCT/US2016/038140, filed Jun. 17, 2016.

International Preliminary Report on Patentability dated Dec. 19, 2017 for corresponding International Application No. PCT/US2016/038140, filed Jun. 17, 2016.

Japanese Office Action dated Oct. 30, 2018 for corresponding Japanese Application No. 2017-564868, filed Dec. 14, 2017.

Canadian Office Action dated Nov. 14, 2018 for corresponding Canadian Application No. 2,989,059, filed Dec. 8, 2017.

Japanese Office Action dated Apr. 17, 2019 for corresponding Japanese Application No. 2017-564868, filed Dec. 14, 2017.

Korean Office Action dated Apr. 18, 2019 for corresponding Korean Application No. 10-2018-7001645, filed Jan. 18, 2018.

Canadian Office Action for CA 2,989,059, dated Jun. 17, 2019, 3 Pages.

U.S. Requirement for Restriction/Election, U.S. Appl. No. 15/729,410, filed Nov. 29, 2019, 6 pages.

China Office Action, 201680035689.9, dated Nov. 5, 2019, 11 pages.

International Search Report and Written Opinion, PCT/2018/055277, dated Jan. 16, 2019, 10 pages.

Communication pursuant to Article 64(3) EPC from corresponding European Patent Application No. 16738251.4, dated Nov. 27, 2020.

International Search Report and Written Opinion, PCT/US2019/055694, dated Mar. 6, 2020, 12 pages.

Prosecution history for corresponding U.S. Appl. No. 15/737,579, filed Dec. 18, 2017 including: Non-Final Rejection dated Nov. 30, 2020, Non-Final Rejection dated Mar. 6, 2020; and Restriction Requirement dated Oct. 22, 2019.

Prosecution history for corresponding U.S. Appl. No. 15/729,410, filed Oct. 10, 2017 including: Notice of Allowance and Fee(s) Due dated Dec. 11, 2020, Notice of Allowance and Fee(s) Due dated Oct. 21, 2020, Non-Final Rejection dated Apr. 2, 2020; and Restriction Requirement dated Nov. 29, 2019.

Communication pursuant to Article 94(3) EPC from corresponding European Patent Application No. 18797278.1, dated Oct. 6, 2021.

WATER-DISPERSIBLE THERMOPLASTIC MATERIAL COMPRISING SULFONATED COPOLYMER FOR USE IN ADDITIVE MANUFACTURING

CROSS-REFERENCE TO RELATED APPLICATION

This Application is a Section 371 National Stage Application of International Application No. PCT/US2018/055277, filed on Oct. 10, 2018, and published as WO2019/075107 on Apr. 18, 2019, in English, which claims the benefit of U.S. Provisional Application Ser. No. 62/570,283 which was filed on Oct. 10, 2017, the contents of all of which are hereby incorporated by reference in their entirety.

BACKGROUND

The present disclosure relates to additive manufacturing materials and methods for printing three-dimensional (3D) parts and support structures. In particular, the present disclosure relates to water-dispersible support materials for use in additive manufacturing systems, and methods of using the support materials as a consumable feedstock in additive manufacturing of printed items.

Additive manufacturing, also called 3D printing, is generally a process in which a three-dimensional (3D) part is built by adding material to form a 3D part rather than subtracting material as in traditional machining. Using one or more additive manufacturing techniques, a three-dimensional solid part of virtually any shape can be printed from a digital model of the part by an additive manufacturing system, commonly referred to as a 3D printer. A typical additive manufacturing work flow includes slicing a three-dimensional computer model into thin cross sections defining a series of layers, translating the result into two-dimensional position data, and transmitting the data to a 3D printer which manufactures a three-dimensional structure in an additive build style. Additive manufacturing entails many different approaches to the method of fabrication, including material extrusion, ink jetting, selective laser sintering, powder/binder jetting, electron-beam melting, electrophotographic imaging, and stereolithographic processes.

In a typical extrusion-based additive manufacturing system (e.g., fused deposition modeling systems developed by Stratasys, Inc., Eden Prairie, Minn.), a 3D part may be printed from a digital representation of the printed part by extruding a viscous, flowable thermoplastic or filled thermoplastic material from a print head along toolpaths at a controlled extrusion rate. The extruded flow of material is deposited as a sequence of roads onto a substrate, where it fuses to previously deposited material and solidifies upon a drop in temperature. The print head includes a liquefier which receives a supply of the thermoplastic material in the form of a flexible filament, and a nozzle tip for dispensing molten material. A filament drive mechanism engages the filament such as with a drive wheel and a bearing surface, or pair of toothed-wheels, and feeds the filament into the liquefier where the filament is heated to a molten pool. The unmelted portion of the filament essentially fills the diameter of the liquefier tube, providing a plug-flow type pumping action to extrude the molten filament material further downstream in the liquefier, from the tip to print a part, to form a continuous flow or toolpath of resin material. The extrusion rate is unthrottled and is based only on the feed rate of filament into the liquefier, and the filament is advanced at a feed rate calculated to achieve a targeted extrusion rate, such as is disclosed in Comb U.S. Pat. No. 6,547,995.

In an electrophotographic 3D printing process, each slice of the digital representation of the 3D part and its support structure is printed or developed using an electrophotographic engine. The electrophotographic engine generally operates in accordance with 2D electrophotographic printing processes, but with a polymeric toner. The electrophotographic engine typically uses a conductive support drum that is coated with a photoconductive material layer, where latent electrostatic images are formed by electrostatic charging, followed by image-wise exposure of the photoconductive layer by an optical source. The latent electrostatic images are then moved to a developing station where the polymeric toner is applied to charged areas, or alternatively to discharged areas of the photoconductive insulator to form the layer of the polymeric toner representing a slice of the 3D part. The developed layer is transferred to a transfer medium, from which the layer is transfused to previously printed layers with heat and/or pressure to build the 3D part.

In a system where the material is deposited in planar layers, the position of the print head relative to the substrate is incremented along an axis (perpendicular to the build plane) after each layer is formed, and the process is then repeated to form a printed part resembling the digital representation. In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited pursuant to the generated geometry during the printing process. The support material adheres to the part material during fabrication and is removable from the completed printed part when the printing process is complete.

Prior art methods of removing support structure have included breaking the support structure off of the part material (typically followed by smoothing out residual rough areas), or dissolving away soluble supports using an alkaline solution over the timeframe of many hours. It is desirable to have a support structure that can be quickly removed without special tools or chemical solutions, and with minimal labor. There is an on-going need for more easily removable support structures, to reduce the post-processingtime and effort needed for printing of the part, and also to eliminate the process effluents used during a traditional chemical support removal bath.

SUMMARY

A water-dispersible sulfonated thermoplastic copolymer produced by an addition type copolymerization reaction, for use as a sacrificial support material in the additive manufacture of a 3D part made of a non-water-dispersible copolymer, wherein the water-dispersible thermoplastic copolymer is a reaction product of an addition type polymerization utilizing a sulfonated monomer, the resulting water-dispersible sulfonated thermoplastic copolymer being dispersible in water resulting in separation of the water-dispersible thermoplastic copolymer from the part made of the non-water-dispersible copolymer.

In another aspect, a water-dispersible sulfonated addition-type thermoplastic copolymer is supplied as a sacrificial support material in the layer-wise additive manufacture of a printed part made of a non-water-dispersible copolymer. The water-dispersible thermoplastic copolymer has a heat deflection temperature within ±20° C. of the heat deflection temperature of the non-water-dispersible thermoplastic copolymer or preferably within ±15° C. of the heat deflection temperature of the non-water-dispersible copolymer, wherein the water-dispersible thermoplastic copolymer is a reaction product in a chain growth reaction of a sulfonated monomer, the water-dispersible sulfonated thermoplastic copolymer being dispersible in water resulting in separation of the water-dispersible thermoplastic copolymer from the part made of the non-water-dispersible polymer.

In another aspect, a water-dispersible sulfonated thermoplastic copolymer is supplied as a sacrificial support material in the layer-wise additive manufacture of a printed part made of a non-water-dispersible copolymer. The water-dispersible thermoplastic copolymer has a glass transition temperature within ±20° C. of the glass transition temperature of the non-water-dispersible polymer or preferably within ±15° C. of the glass transition temperature of the non-water-dispersible polymer, wherein the water-dispersible polymer is a reaction product of an addition type polymerization of a metal sulfonated monomer, the resulting water-dispersible sulfonated polymer being dispersible in water resulting in separation of the water-dispersible polymer from the part comprising the non-water-dispersible polymer.

In another aspect, the water-dispersible sulfonated thermoplastic copolymer comprises a primary chain of monomers and the polymerization of the sulfonated monomer occurs primarily on the primary chain.

In another aspect, the water-dispersible sulfonated polymer is a reaction product of an addition type polymerization of a metal sulfonated-monomer. One useful reaction product is a sulfonated polystyrene which is sometimes referred to as a polystyrene sulfonate.

In yet another aspect of this disclosure, the water-dispersible sulfonated polymer has a charge density of at least approximately 0.4 meq./g, such that the water-dispersible sulfonated polymer is dispersible in water resulting in separation of the water-dispersible sulfonated polymer from the part comprising the non-water-dispersible polymer.

In a further aspect of this disclosure, the water-dispersible sulfonated polymer is used in a method of manufacturing a sacrificial support structure for use with a 3D printed part made of the non-water-dispersible polymer. The method of manufacturing comprises printing the support structure from the water-dispersible sulfonated polymer in coordination with printing the 3D part from the non-water-dispersible polymer, the water-dispersible sulfonated polymer having a glass transition temperature wherein the water-dispersible polymer has a glass transition temperature within ±20° C. of the glass transition temperature of the non-water-dispersible polymer or preferably within ±15° C. of the glass transition temperature of the non-water-dispersible polymer wherein the water-dispersible polymer is a reaction product of a sulfonated monomer, and separating the water-dispersible polymer from the 3D part by subjecting the water-dispersible sulfonated polymer to water.

In a further aspect of this disclosure, the water-dispersible sulfonated polymer is used in a method of manufacturing a sacrificial support structure for a part made of the non-water-dispersible polymer. The method of manufacturing comprises printing the support structure from the water-dispersible sulfonated polymer in coordination with printing the 3D part from the non-water-dispersible polymer, the water-dispersible sulfonated polymer having a heat deflection temperature wherein the water-dispersible polymer has a heat deflection temperature within ±20° C. of the heat deflection temperature of the non-water-dispersible polymer or preferably within ±15° C. of the heat deflection temperature of the non-water-dispersible polymer, wherein the water-dispersible thermoplastic copolymer is a reaction product of a sulfonated monomer, and separating the water-dispersible thermoplastic copolymer from the 3D part by subjecting the water-dispersible sulfonated thermoplastic copolymer to water.

In another aspect of this disclosure the water-dispersible sulfonated thermoplastic copolymer preferably has at least approximately 18 mol % metal sulfonated styrene salt as a monomer in the thermoplastic copolymer.

In a further aspect, the water-dispersible thermoplastic copolymer of this disclosure is an addition-type sulfonated thermoplastic copolymer which is substantially amorphous.

DEFINITIONS

Unless otherwise specified, the following terms as used herein have the meanings provided below:

The term "polymer" refers to a polymerized molecule having one or more monomer species, and includes homopolymers and copolymers. The term "copolymer" refers to a polymer having two or more monomer species, and includes terpolymers (i.e., copolymers having three monomer species). The terms copolymer and polymer may be used interchangeably herein.

The term "addition polymerization" refers to a polymer that is formed by an addition reaction where monomers bond together via rearrangement of bonds without the loss of any atom or molecule under specific conditions of heat, pressure, and/or the presence of a catalyst. Sometimes this type of polymerization is also referred to as "chain growth" polymerization, free radical polymerization, and such polymer chains may be self initiated through heat or require the use of a catalyst. Additive polymerization is in contrast to a condensation polymerization wherein the polymer is formed by a condensation reaction where a molecule, usually water, is lost during the formation.

The terms "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the inventive scope of the present disclosure.

Reference to "a" chemical compound refers to one or more molecules of the chemical compound, rather than being limited to a single molecule of the chemical compound. Furthermore, the one or more molecules may or may not be identical, so long as they fall under the category of the chemical compound. Thus, for example, "a" polystyrene is interpreted to include one or more polymer molecules of the polystyrene, where the polymer molecules may or may not be identical (e.g., different molecular weights and/or isomers).

The terms "at least one" and "one or more of" an element are used interchangeably, and have the same meaning that includes a single element and a plurality of the elements, and may also be represented by the suffix "(s)" at the end of the element. For example, "at least one polystyrene", "one or more polystyrenes", and "polystyrene(s)" may be used interchangeably and have the same meaning.

The terms "about", approximately and "substantially" are used herein with respect to measurable values and ranges due to expected variations known to those skilled in the art (e.g., limitations and variability in measurements).

The term "providing", such as when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

"Soluble" as referred to herein can be used interchangeably with "disintegrable" and "dissolvable" and relates to materials that disintegrate in a solution or dispersion. Upon disintegration, the water-dispersible material can break apart into smaller pieces and/or particles of polymer in the solution or dispersion. Some or all of the water-dispersible material may also dissolve into the solution or dispersion upon disintegration.

"Water soluble" as used herein relates to materials that dissolve in tap water that is about neutral pH. It is understood that the pH of tap water can vary depending on the municipality and as such the pH can vary between about 5 and about 9 or in some cases between about 6 and 8. Although these pH's are slightly basic or slightly acidic, the defining feature of the water soluble materials is that they do not require an acidic or basic solution to disintegrate and can disintegrate in water at about neutral pH, e.g. tap water.

"High temperature build environment" as referred to herein relates to build environments of about 45° C. or greater in additive manufacturing systems.

"Heat deflection temperature" or "heat distortion temperature" (HDT) is the temperature at which a polymer sample deforms under a specified load and is determined by the test procedure outlined in ASTM D648.

"Thermally stable" as referred to herein relates to the material having a heat deflection temperature sometimes referred to as heat distortion temperature (HDT) compatible with the desired build environment such that they do not exceed their thermal-degradation kinetics thresholds.

The term "polystyrene" referred to herein relates to an aromatic polymer made from a styrene monomer. Polystyrene's chemical formula is $(C8H8)n$. It is a thermoplastic polymer being formed by an addition type reaction wherein unsaturated groups such as ethylene connect the styrene monomers.

The term "vinyl" referred to herein is used interchangeably with the term "unsaturated" and refers to the double bond between two carbon atoms which is used to connect monomers to form the polymeric chain.

The term "sulfo-copolymer" or "sulfonated copolymer" referred to herein is a reaction product of monomers containing a sulfonate group. The terms sulfo-copolymer or sulfonated copolymer are used interchangeably herein.

The term "polyethylene" referred to herein relates to a polymer formed of ethylene monomers through an addition type reaction having the general formula of $(C2H4)n$. Significant quantities of polyethylene (PE) are formed through free radical polymerization which is a form of addition type polymerization. Often, polyethylene is characterized by its density such as low density PE (LDPE), Medium density PE (MDPE) and High Density (HDPE), the density in each case being subject to the amount of linear or branched structure in the PE.

The term "polypropylene" (PP) referred to herein relates to a polymer formed of propylene monomers through an addition type reaction having the general formula of $(C3H6)n$. Structurally PP is similar to PE with a methyl group substituted on every other carbon in the main polymeric chain and therefore PP has many similar properties to PE. PP can also be produced as a copolymer with PE The term "polybutylene" (PB-1) referred to herein relates to a polymer formed of 1-butene monomers through an addition type reaction having the general formula of $(C4H8)n$.

The term "aliphatic polymer" referred to herein relates to a polymer formed of aliphatic monomers through an addition type reaction which have either straight or branched chains with no aromatic groups within the polymer chain.

All percentages in this disclosure are on a mole basis unless otherwise specified.

DETAILED DESCRIPTION

The present disclosure is directed to a water-dispersible sulfonated thermoplastic copolymer material for use as a consumable feedstock in 3D printing. The sulfonated thermoplastic copolymer material can be used for printing sacrificial support structures for 3D parts built in a range of build temperature environments of additive manufacturing systems. It can also be used for layer-wise printing of dissolvable 3D parts. The sulfonated thermoplastic copolymer material is made from an addition reaction and preferably the sulfonation of the copolymer is intended for the primary chain or as it is sometimes referred to as the "backbone" of the copolymer. The thermal properties of the copolymer can be tailored to the process in which it will be used, e.g., pairing the water-dispersible sulfonated thermoplastic copolymer with a material used for printing the 3D parts, by selecting a desired molecular weight and formulation for the reaction product.

In general, the support copolymer must have good adhesion to the part material (through selection of similar chemical make-up), flexibility/lack of brittleness to allow for fabrication into thin extruded filament material when used in fused deposition modeling systems, provide sufficient support during the additive manufacturing process (through appropriate selection of materials with reasonably similar glass transition temperatures, and exhibit thermal stability for and during the manufacturing process. This is done through proper selection of the copolymer types. The selection of the first of the at least two sulfonated polymers used to create the backbone structure of the polymer is done with a focus on providing good chemical adhesion by matching the chemical nature of the part material (which also has a similar glass transition temperature); selection of the at least one additional typically unsulfonated polymer in the backbone is selected so as to modify filament creation and performance properties.

The water-dispersible sulfonated thermoplastic copolymer of the present disclosure functions as a sacrificial material for an associated part material in additive manufacturing (aka 3D printing) applications. A sacrificial support material can be desirable where overhanging features are required, where significant angular slopes exist in the printed items and where it is essential to also preserve delicate features in the printed item, such as small orifices or controlled pore structures, and in some situations, to laterally encase the printed item. Once the item has been printed, the support structure of the water-dispersible material is removed to reveal the completed printed item without damaging any of the critical or delicate geometrical features of the printed item. To accomplish this removal, the disclosed material is water-dispersible, allowing the support structure to be at least partially and typically completely dissolved away from the printed item. The support structure may be made solely of the water-dispersible thermoplastic copolymer of this disclosure or other non-dispersible copolymers may be incorporated therein as long as the water-dispersibility is not substantially affected. In addition mixtures of other sulfonated polymers or copolymers, water-soluble polymers or copolymers, and non-soluble polymers or copolymers; additives, fillers, and/or stabilizers may be added to the water-dispersible thermoplastic copolymer.

The present disclosure also includes the use of the water-dispersible sulfonated thermoplastic copolymer for manufacturing a dissolvable part suitable for downstream uses such as sacrificial tooling. A sacrificial tool encompassing the water-dispersible thermoplastic copolymer may be a dissolvable core type structure on which a part or device is subsequently produced or providing some type of platform for subsequent manufacture of a part or device. Such a process is distinguished from for example a direct additive manufacturing process wherein both the part and the support structure are concurrently printed. For example, a device made of thermoplastic composite material may be formed around the sacrificial tooling made of the water-dispersible thermoplastic copolymer. Once the composite material device is made, the water-dispersible thermoplastic copolymer is disintegrated by introducing the water-dispersible thermoplastic copolymer to water.

The water used to disperse the water-dispersible sulfonated thermoplastic copolymer of the present disclosure is plain tap or naturally occurring water. Removing a support structure from a 3D part or dissolving a sacrificial tool does not require the presence of a basic or acidic environment or heating of the aqueous solution. In addition, the solubility of the water-dispersible material is sufficient for use of removal of supports in an automated process or hands-free manner Plain tap water typically has an average pH of approximately 7. However, water pH varies greatly, ranging anywhere from having a pH between approximately 5.0 and 9, is also suitable or in some cases between a pH of approximately 6 and 8.In any event, the pH of the water does not need to be adjusted to disintegrate the water-dispersible thermoplastic copolymer. After it disintegrates, the dispersed water soluble thermoplastic copolymer solution may be processed by increasing the ionic strength of the solution to precipitate out the water-dispersible thermoplastic copolymer.

In the embodiment of additive manufacturing, in order to effectively print a support structure in coordination with a printed item, for example in a fused deposition modeling process, amorphous support materials preferably have a glass transition temperature that is approximately equivalent to or higher than the Tg of the part material. For example a Tg of ±20 C with a more preferred range of ±15 C of the support material with respect to the Tg of the part material would be considered approximately equivalent. The size and amount of the sulfonated monomer will have an effect on the Tg of the thermoplastic copolymer. That is, the more additions of monomer (whether sulfonated or not) on a chain will increase the molecular weight and may increase the Tg and heat deflection temperature of the material. This allows the matching of thermal properties of the support material to a part material, so that the consumable materials printed together as a material pair will have similar heat deflection temperatures, degradation temperatures and other thermal characteristics. For example, similar glass transition and heat deflection temperatures allow the part and support materials to be printed together in the same heated environment while preventing excessive distortions and curling, as well as part:support distortion mismatches. Table 1 shows some common part materials used in additive manufacturing and their glass transition temperatures. In accordance with the present invention, for a given part material, a customized molecular weight, tap-water soluble sulfonated thermoplastic copolymer support material can be produced using an addition reaction, to thereby perform with similar melt characteristics of the part material.

TABLE 1

| Part Material | Glass Transition Temperature, Tg |
|---|---|
| Polylactic Acid | 48 C. |
| Acrylonitrile Butadiene Styrene | 123 C. |
| PEEK | 150 C. |
| Polycarbonate | 155 C. |
| Ultem ® 9085 | 185 C. |
| Ultem ® 1010 | 217 C. |

The material selection choice for the support material:part material match is done partially with a focus on Tg, but is also done with respect to chemical makeup of the part material. A support material must adhere at least minimally to part material to function properly as a support structure. Without adherence, parts will not be made properly because they will repel away from a nearby support. By careful selection of the support chemistry through the selection of a first sulfonated monomer, the support material:part material match is done through selecting 'like' monomers, and adhesion will occur appropriately. The sulfonated monomer portions of the resulting copolymer are easily affected by water later on in the support removal process, causing support material dispersibility in a very short timeframe, compared to traditional alkaline support material removal times.

The selection of the second unsulfonated monomer in the thermoplastic copolymer is done to further customize or tailor the filament performance properties.

For semi-crystalline or crystalline support materials, heat deflection temperature is more indicative of acceptable performance than Tg pairing of part and support materials. An example of suitably equivalent heat deflection temperatures are ±20° C. with a more preferred range of ±15° C.

The water-dispersible sulfonated thermoplastic copolymer material of the present disclosure may be configured for use with several different additive manufacturing techniques, such as extrusion-based additive manufacturing systems, high-speed sintering systems, selective laser sintering systems, electrophotography-based additive manufacturing systems, and the like. The water-dispersible sulfonated thermoplastic copolymer material may be configured in whatever feedstock geometries or format is required for use as a consumable material in a given additive manufacturing system or technology, including filament, ribbon, powder, liquid, pellet, or slug formats.

Depending on the additive manufacturing technique selected, it may be desired to customize the level of crystallinity of the thermoplastic copolymeric material. For example, in SLS or other sintering applications, crystallinity is desired. In fused deposition modeling systems applications, it is typically more desirable to use amorphous or semi-crystalline copolymeric materials. The level of crystallinity can be manipulated during manufacture of the material via monomer selection.

Figure 1:
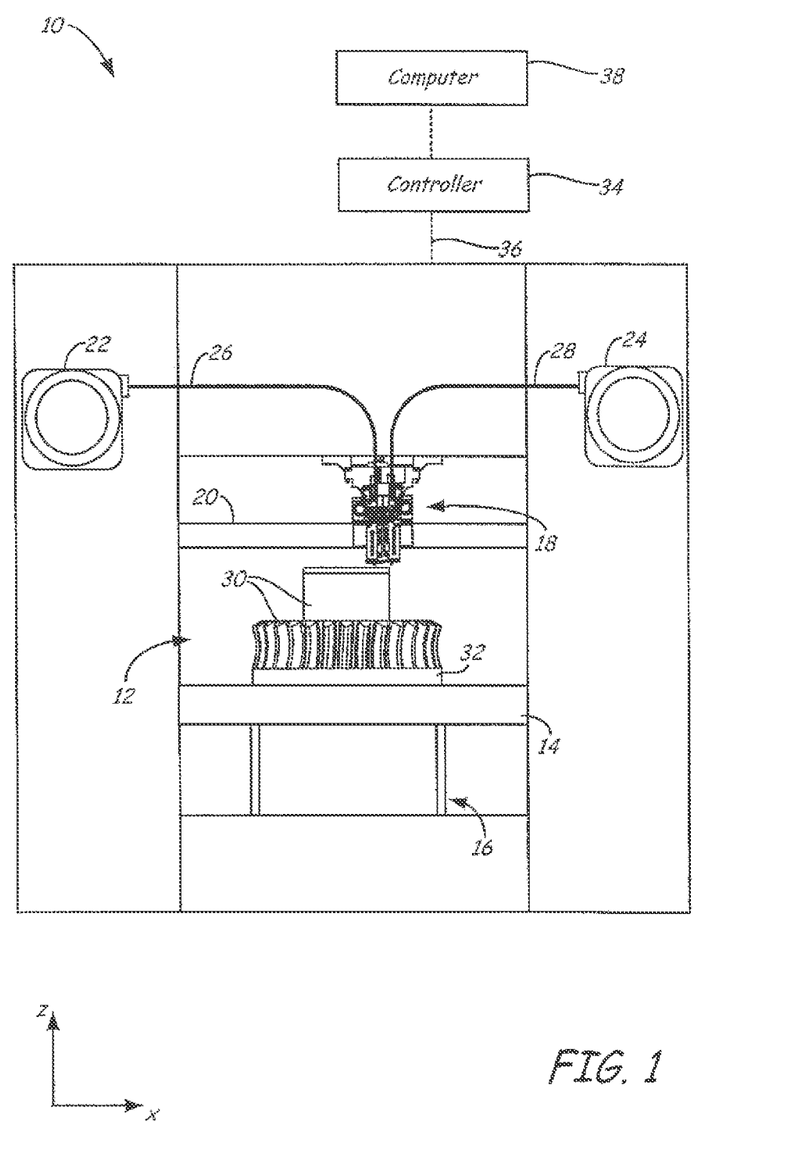
FIG. 1 is a front view of an extrusion-based additive manufacturing system configured to print printed parts and support structures, where the support structures are printed from a water-dispersible material of the present disclosure.

As shown in FIG. 1, system 10 is an example of an extrusion-based additive manufacturing system for printing or otherwise building 3D parts and support structures using a layer-based, additive manufacturing technique, where the support structures may be printed from the water-dispersible sulfonated thermoplastic copolymer material of the present disclosure. Suitable extrusion-based additive manufacturing systems for system 10 include fused deposition modeling systems developed by Stratasys, Inc., Eden Prairie, Minn. under the trademark "FDM".

In the illustrated embodiment, system 10 includes chamber 12, platen 14, platen gantry 16, print head 18, head gantry 20, and consumable assemblies 22 and 24. Chamber 12 is an enclosed environment that contains platen 14 for printing printed parts and support structures. Chamber 12 may be heated (e.g., with circulating heated air) to reduce the rate at which the part and support materials solidify after being extruded and deposited.

Alternatively, the heating may be localized rather than in an entire chamber 12. For example, the deposition region may be heated in a localized manner Example techniques for locally heating a deposition region include heating platen 14 and/or with directing heat air jets towards platen 14 and/or the printed parts/support structures being printed). The heating anneals the printed layers of the printed parts (and support structures) to partially relieve the residual stresses, thereby reducing curling of the printed parts and support structures.

Platen 14 is a platform on which printed parts and support structures are printed in a layer-by-layer manner. In some embodiments, platen 14 may also include a flexible polymeric film or other substrate on which the printed parts and support structures are printed. In the shown example, print head 18 is a dual-tip extrusion head configured to receive consumable filaments from consumable assemblies 22 and 24 (e.g., via guide tubes 26 and 28) for printing printed 3D part 30 and support structure 32 on platen 14. Consumable assembly 22 may contain a supply of a part material, such as a high-performance part material, for printing printed 3D part 30 from the part material. Consumable assembly 24 may contain a supply of a support material of the present disclosure for printing support structure 32 from the given support material.

Platen 14 is supported by platen gantry 16, which is a gantry assembly configured to move platen 14 along (or substantially along) a vertical z-axis. Correspondingly, print head 18 is supported by head gantry 20, which is a gantry assembly configured to move print head 18 in (or substantially in) a horizontal x-y plane above chamber 12.

In an alternative embodiment, platen 14 may be configured to move in the horizontal x-y plane within chamber 12, and print head 18 may be configured to move along the z-axis. Other similar arrangements may also be used such that one or both of platen 14 and print head 18 are moveable relative to each other. Platen 14 and print head 18 may also be oriented along different axes. For example, platen 14 may be oriented vertically and print head 18 may print printed 3D part 30 and support structure 32 along the x-axis or the y-axis.

System 10 also includes controller 34, which is one or more control circuits configured to monitor and operate the components of system 10. For example, one or more of the control functions performed by controller 34 can be implemented in hardware, software, firmware, and the like, or a combination thereof. Controller 34 may communicate over communication line 36 with chamber 12 (e.g., with a heating unit for chamber 12), print head 18, and various sensors, calibration devices, display devices, and/or user input devices.

System 12 and/or controller 34 may also communicate with computer 38, which is one or more computer-based systems that communicates with system 12 and/or controller 34, and may be separate from system 12, or alternatively may be an internal component of system 12. Computer 38 includes computer-based hardware, such as data storage devices, processors, memory modules, and the like for generating and storing tool path and related printing instructions. Computer 38 may transmit these instructions to system 10 (e.g., to controller 34) to perform printing operations.

Figure 2:
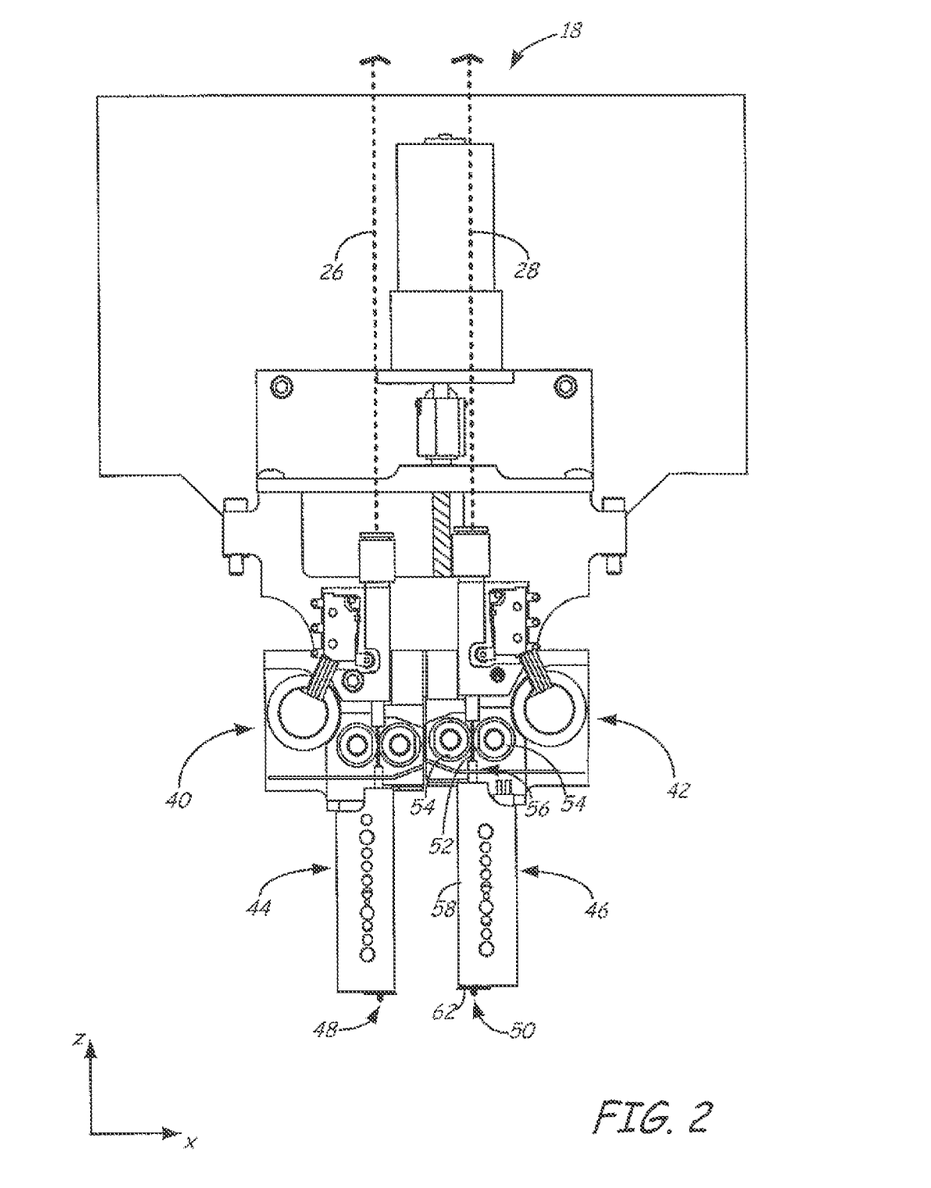
FIG. 2 is a front view of a print head of the extrusion-based additive manufacturing system.

The print head 18 can have any suitable configuration. FIG. 2 illustrates a suitable dual-tip device for print head 18, as described in Leavitt, U.S. Pat. No. 7,625,200. Other examples of suitable devices for print head 18 include those disclosed in Crump et al., U.S. Pat. No. 5,503,785; LaBossiere, et al., U.S. Pat. Nos. 7,384,255 and 7,604,470; Leavitt, U.S. Pat. No. 7,625,200; Batchelder et al., U.S. Pat. No. 7,896,209; Comb et al., U.S. Pat. No. 8,153,182; Swanson et al., U.S. Pat. Nos. 8,419,996 and 8,647,102; Batchelder U.S. Pat. No. 8,926,882; and Barclay et al. U.S. Published Patent Application 20180043627. In one example, during a build operation, one or more drive mechanisms (shown in FIG. 3) are directed to intermittently feed the modeling and support materials (e.g., consumable filaments via guide tube assemblies 26 and 28) through print head 18 from supply sources 22 and 24.

Figure 3:
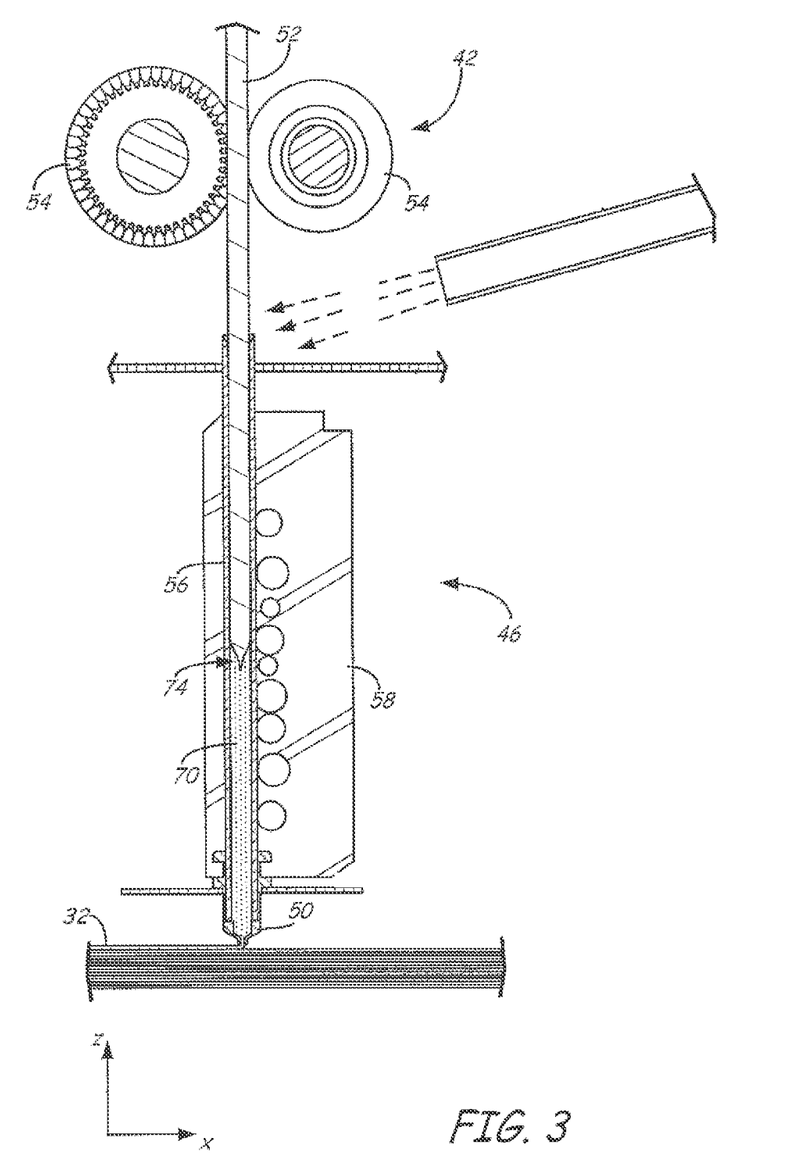
FIG. 3 is an expanded sectional view of a drive mechanism, a liquefier assembly, and a nozzle of the print head for use in the extrusion-based additive manufacturing system.

In the shown embodiment of FIG. 2, print head 18 includes two drive mechanisms 40 and 42, two liquefier assemblies 44 and 46, and two nozzles 48 and 50, where drive mechanism 40, liquefier assembly 44, and nozzle 48 are for receiving and extruding the part material, and drive mechanism 42, liquefier assembly 46, and nozzle 50 are for receiving and extruding the support material of the present disclosure. In this embodiment the part material and the support material each preferably have a filament geometry for use with print head 18. For example, as shown in FIGS. 2 and 3, the support material may be provided as filament 52. During operation, controller 34 may direct wheels 54 of drive mechanism 42 to selectively draw successive segments filament 52 (of the support material) from consumable assembly 24 (via guide tube 28), and feed filament 52 to liquefier assembly 46. In alternative embodiments, the consumable material may be provided in other geometries or formats adapted for other types of print heads and feed systems, such as powder, liquid, pellet, slug, or ribbon forms.

Liquefier assembly 46 is heated to melt the provided consumable material to form melt 70. Preferred liquefier temperatures will vary depending on the particular copolymer composition of the consumable material, and are preferably above the melt processing temperature of the material. The molten portion of the material (i.e., melt 70) forms meniscus 74 around the unmelted portion of filament 52. During an extrusion of melt 70 through nozzle 50, the downward movement of filament 52 functions as a viscosity pump to extrude the support material of melt 70 out of nozzle 50 as extruded roads, to thereby print support structure 32 in a layer-by-layer manner in coordination with the printing of printed 3D part 30. After the print operation is complete, the resulting printed 3D part 30 and support structure 32 may be removed from chamber 12. Support structure 32 may then be sacrificially removed from printed 3D part 30, such as by dissolution in tap water.

The compositions of the present invention may also be provided in powder form for use in additive manufacturing systems that use powder-based consumables, e.g., electrophotography-based additive manufacturing systems and selective laser sintering systems. Electrophotography-based additive manufacturing systems are disclosed, for example, in Hanson et al., U.S. Pat. Nos. 8,879,957 and 9,423,756, and Comb et al., U.S. Publication Nos. 2013/0186549 and 2013/0186558. Such EP-based systems utilize charged particle materials, referred to as toner powder materials, for printing 3D parts and support structures. Toner powder materials for use in EP-based AM systems have a particle size distribution ranging from about 5 micrometers to about 50 micrometers, and include a charge control agent. The addition of a charge control agent to polymer powders for EP-based systems is disclosed in Orrock et al., U.S. Pat. No. 9,523,934, the disclosure of which is incorporated by reference to the extent that it does not conflict with the present disclosure.

In an exemplary electrophotography based additive manufacturing system, each layer or partial thickness layer may be developed using electrophotography and carried from an electrophotography (EP) engine by a transfer medium (e.g., a rotatable belt or drum). The layer or partial thickness layer includes part material, and optionally support material. The partial thickness layer is then transferred to a build platform to print the 3D part (or support structure) in a layer-by-layer manner, where the successive partial thickness layers are transfused together. Printing with partial thickness layers increases the resolution of the 3D part in the z direction relative to 3D parts printed with layers having the thickness of the nominal thickness of the slice.

As mentioned above, the water-dispersible material of the present disclosure compositionally comprises a sulfonated polymer and in particular a sulfonated thermoplastic copolymer formed by addition polymerization.

As an example of an addition polymerization, sodium styrene sulfonate monomer as illustrated below is copolymerized with other unsulfonated monomers providing desired filament performance properties:

The selection of the sulfonated thermoplastic monomer for use as support material will be done to match the basic chemical makeup of the part material selected. When incorporated into the primary polymeric chain, it produces a support material that has a sufficient adhesion and glass transition temperature. If only this first sulfonated monomer was used to create a thermoplastic polymer, it would not have appropriate flexibility and/or viscosity for use as an extrudable printing material, even though it would have good ultimate dispersibility in the support material removal process. A second monomer is needed to provide the non-adhesion based properties that make for a good support material. The selection of at least one second thermoplastic unsulfonated monomer in the copolymer material can manipulate the glass transition temperature to better match the part material, as well as manipulating viscosity of the melt, brittleness of extruded filament, etc. The other monomeric material may also be chosen to provide thermal stability to the sulfonated thermoplastic copolymer for and during the additive manufacturing heating process.

It is believed to be difficult to add sulfonated cyclic pendant groups onto the backbone of a thermoplastic polymer molecule. By using sulfonated cyclic monomers as a portion of the copolymerization reaction, large thermoplastic sulfonated copolymers can be achieved, having the desired dispersiblity requirement needed for support materials.

It is believed that another important characteristic of the sulfonated thermoplastic copolymers of this disclosure is "charge density". Cationic and anionic polymers are characterized by their charge density. An anionic polymer is a polymer containing groups reasonably anticipated to become anionic. Charge density is usually expressed in milliequivalents (meq) of ionic groups per gram of polymer. Suitable charge densities for of this disclosure are in the approximate range of (0.4 to 0.9 meq/g). Suitable charge densities are also those that for any particular sulfonated thermoplastic copolymer provide a water-dispersibility characteristic to that sulfonated thermoplastic copolymer. Sulfonated polystyrenes with high charge densities are more easily and quickly dispersed in water, lending themselves to faster manufacturing removal. Lower charge densities produce thermoplastic copolymers that are resistant to water-dispersibility. Higher charge density relating to better dispersibility in water is believed to be also a characteristic of other anionic thermoplastic copolymers as anionic thermoplastic copolymers are defined herein.

Salts of sulfonated styrene and other addition type thermoplastic monomers are specifically contemplated in this disclosure. The sulfonation occurs through the use of sulfonated monomer substituent group in the monomer. A particularly useful group of addition copolymers are those that are derived from unsaturated vinyl monomers, (Stucture 1)

where X represents a functional group defining the particular copolymer being produced. A non-exhaustive list of such polymers includes polymers and copolymers formed from styrene, methyl methacrylate, methyl acrylate, vinyl acetate, vinyl chloride, ethylene, polypropylene, α-olefins, isobutylene, dienes, vinyl chloride, vinylidene chloride, vinyl fluoride, tetrafluoroethylene, vinyl ethers, vinyl esters, acrylic and methacrylic esters, acrylonitrile and any combination of the previously mentioned monomers and their derivatives that are capable of forming copolymers.

Sulfonation of such additive copolymers provides a mechanism for solubility. As mentioned previously, of particular usefulness is sodium styrene sulfonate although other salts such as lithium, magnesium, calcium, ammonium, or potassium sulfonates are also contemplated.

With regard to polystyrene specifically, pre-sulfonation of the monomer of choice may occur using one or both of sodium p-styrenesulfonate or sodium styrenesulfonate, as long as polymerization occurs.

Sulfonated monomers may be reacted with monomers not containing a sulfonated group to result in copolymer of a thermoplastic material. It is contemplated that the resulting thermoplastic copolymer may have 100% sulfonated monomer or some lower combination of sulfonate and not sulfonated monomer. In the case of styrene, the non-sulfonated styrene thermoplastic copolymer may be as much as about 65% mole ratio of the total polymeric component compared to the sulfonated styrene monomer. One suitable mixture is about a 50/50 mole ratio of sulfonated to non-sulfonated monomer. The minimum amount of sulfonated monomer may depend on the functional monomer group itself, and where the minimum amount of sulfonated monomer is dictated by its water-dispersibility. It is believed that approximately 18 to 40 mol % sulfonated monomer or approximately 20 to 35 mol % sulfonated monomer, or approximately 25 to 30 mol % sulfonated monomer provides suitable water-dispersibility in a support material for use in FDM processes.

One particular copolymer of interest is Poly(sodium 4-sulfostyrene-co-styrene) in a mole ratio of 35:65 with styrene, which results in a glass transition temperature (Tg) of approximately 110 C having a molecular weight of approximately 125,000. This copolymer is a good additive manufacturing support candidate for ABS, ASA, and PS as it is water-dispersible having excellent thermal stability and an appropriate Tg to the build material. The sulfonated styrene monomer content of the water-dispersible thermoplastic copolymer will enhance lamination strength to styrenic part materials. The adherence of this copolymer to ABS, ASA, and PS has been found to be better than condensation polymers readily available.

Aa suitable concentration of sodium 4-sulfostyrene as the sulfonated monomer in the thermoplastic copolymer blend is approximately 5-50 mol % of the sulfonated monomer in the copolymer and preferably 15-35% mol % of the sulfonated monomer in the copolymer A typical molecular weight of this copolymer is approximately 50-200,000. Depending on co-monomers paired together, concentration of sodium 4-sulfostyrene (NaSS): 5-50 mol %, preferably 15-35%.

Other additional comonomers to be used as at least the second monomer in the thermoplastic copolymer be used to increase Tg and otherwise manipulate FDM filament properties to adhere, remain flexible and not degrade at high temperatures materials such as polycarbonate; polysulfones, polyetherimides, and the like.

Examples of suitable comonomers for use in the other portion of the resulting copolymer, to further manipulate subsequent filament properties include styrenes such as styrene, chlorostyrene, dichlorostyrene, bromostyrene, dibromostyrene, fluorostyrene, trifluorostyrene, nitrostyrene, cyanostyrene, α-methylstyrene, p-chloromethylstyrene, p-cyanostyrene, p-amino styrene, p-acetoxystyrene, p-styrenesulfonyl chloride, ethyl p-styrenesulfonyl, methyl p-styrenesulfonyl, propyl p-styrenesulfonyl, p-butoxystyrene, p-hydroxystyrene, 4-vinylbenzoic acid, 3-isopropenyl-α,α'-dimethylbenzyl isocyanate and vinylbenzyltrimethylammonium chloride.

Vinyl ethers may also be comonomers and examples of suitable vinyl ethers include isobutyl vinyl ether, ethyl vinyl ether, 2-phenyl vinyl alkyl ether, nitrophenyl vinyl ether, cyanophenyl vinyl ether, chlorophenyl vinyl ether and chloroethyl vinyl ether.

Suitable acrylic acid esters may also be comonomers and some examples include methyl acrylate, ethyl acrylate, propyl acrylate, butyl acrylate, pentyl acrylate, hexyl acrylate, decyl acrylate, lauryl acrylate, octyl acrylate, dodecyl acrylate, stearylacrylate, 2-ethylhexylacrylate, cyclohexyl acrylate, bornyl acrylate, 2-ethoxyethyl acrylate, 2-butoxyethyl acrylate, 2-hydroxyethyl acrylate, tetrahydrofurfuryl acrylate, methoxyethylene glycol acrylate, ethylcarbitol acrylate, 2-hydroxypropyl acrylate, 4-hydroxybutyl acrylate, 3-(trimethoxysilyl)propyl acrylate, polyethylene glycol acrylate, glycidyl acrylate, 2-(acryloyloxy)ethyl phosphate, 2,2,3,3-tetrafluoropropyl acrylate, 2,2,2-trifluoroethyl acrylate, 2,2,3,3,3-pentafluoropropyl acrylate and 2,2,3,4,4,4-hexafluorobutyl acrylate, Examples of methacrylic acid esters suitable as comonomers include methyl methacrylate, t-butyl methacrylate, sec-butyl methacrylate, i-butyl methacrylate, i-propyl methacrylate, decyl methacrylate, lauryl methacrylate, octyl methacrylate, dodecyl methacrylate, stearyl methacrylate, cyclohexyl methacrylate, bornyl methacrylate, benzyl methacrylate, phenyl methacrylate, glycidyl methacrylate, polyethylene glycol methacrylate, 2-hydroxyethyl methacrylate, tetrahydrofurfuryl methacrylate, methoxyethylene glycol methacrylate, ethylcarbitol methacrylate, 2-hydroxypropyl methacrylate, 4-hydroxybutyl methacrylate, 2-(methacryloyloxy)ethyl phosphate, 2-(dimethylamino)ethyl methacrylate, 2-(diethylamino)ethyl methacrylate, 3-(dimethylamino)propyl methacrylate, 2-(isocyanato)ethyl methacrylate, 2,4,6-tribromophenyl methacrylate, 2,2,3,3-tetrafluoropropyl methacrylate, 2,2,2-trifluoroethyl methacrylate, 2,2,3,3,3-pentafluoropropyl methacrylate, 2,2,3,4,4,4-hexafluorobutyl methacrylate and diacetone methacrylate, Maleimides are also suitable as comonomers and suitable examples include N-phenylmaleimide, N-(chlorophenyl)maleimide, N-(methylphenyl)maleimide, N-(isopropylphenyl)maleimide, N-(sulfophenyl)maleimide, N-methylphenylmaleimide, N-bromophenylmaleimide, N-naphthylmaleimide, N-hydroxyphenylmaleimide, N-methoxyphenylmaleimide, N-carboxyphenylmaleimide, N-(nitrophenyl)maleimide, N-benzylmaleimide, N-(4-acetoxy-1-naphthyl)maleimide, N-(4-oxy-1-naphthyl)maleimide, N-(3-fluoranthyl)maleimide, N-(5-fluoresceinyl)maleimide, N-(1-pyrenyl)maleimide, N-(2,3-xylyl)maleimide, N-(2,4-xylyl)maleimide, N-(2,6-xylyl)maleimide, N-(aminophenyl)maleimide, N-(tribromophenyl)maleimide, N-[4-(2-benzimidazolyl)phenyl]maleimide, N-(3,5-dinitrophenyl)maleimide, N-(9-acridinyl)maleimide, maleimide, N-(sulfo-phenyl)maleimide, N-cyclohexylmaleimide, N-methylmaleimide, N-ethylmaleimide and N-methoxyphenylmaleimide, Suitable examples of fumaric acid diesters include dibutyl fumarate, dipropyl fumarate, diethyl fumarate and dicyclohexyl fumarate, fumaric acid monoesters such as butyl fumarate, propyl fumarate and ethyl fumarate.

Maleic acid diesters such as dibutyl maleate, dipropyl maleate and diethyl maleate, and maleic acid monoesters such as butyl maleate, propyl maleate, ethyl maleate and cyclohexyl maleate, and acid anhydrides such as maleic anhydride and citraconic anhydride may also be suitable candidates as comonomers under this disclosure.

Examples of acrylamides suitable as comonomers include acrylamide, N-methylacrylamide, N-ethylacrylamide, 2-hydroxyethyl-acrylamide, N,N-diethylacrylamide, acryloylmorpholine, N,N-dimethylaminopropylacrylamide, isopropylacrylamide, N-methylolacrylamide, sulfophenylacrylamide, 2-acrylamido-2-methylpropanesulfonic acid, 2-acrylamido-1-methylsulfonic acid, diacetoneacrylamide and acrylamidoalkyltrialkylammonium chloride, methacrylamides such as methacrylamide, N-methylmethacrylamide, N-ethylmethacrylamide, 2-hydroxyethylmeth-acrylamide, N,N-diethylmethacrylamide, N,N-di-methylmethacrylamide, N-methylolmethacrylamide, methacryloylmorpholine, N,N-dimethylaminopropylmethacrylamide, iso-propylmethacrylamide, 2-methacrylamido-2-methylpropanesulfonic acid and methacrylamidoalkyltrialkylammonium chloride.

In addition, vinylpyrrolidone, sulfophenyl-itaconimide, acrylonitrile, methacrylonitrile, fumaronitrile, α-cyanoethyl acrylate, citraconic acid, citraconic anhydride, vinyl acetate, vinyl propionate, vinyl pivalate, vinyl versatate, crotonic acid, itaconic acid, fumaric acid, maleic acid, mono-2-(methacryloyloxy)ethyl phthalate, mono-2-(methacryloyloxy)ethyl succinate, mono-2-(acryloyloxy)ethyl succinate, methacryloxypropyltri-methoxysilane, methacryloxypropyldimethoxysilane, acrolein, vinyl methyl ketone, N-vinylacetamide, N-vinylformamide, vinyl ethyl ketone, vinylsulfonic acid, allylsulfonic acid, dehydroalanine, sulfur dioxide, isobutene, N-vinylcarbazole, vinylidene dicyanide, p-quinodimethane, chlorotrifluoroethylene, tetrafluoroethylene, norbornene, N-vinylcarbazole, acrylic acid, methacrylic acid and the like may also be co monomers under this disclosure.

Among these, in view of copolymerizability with p-styrenesulfonic acid (salt), availability and the like, preferred are methacrylic acid (salt), methyl methacrylate, 2-hydroxyethyl methacrylate, glycidyl methacrylate, maleic anhydride, maleic acid (salt), N-phenylmaleimide, N-cyclohexylmaleimide, methacrylamide, methacryloylmorpholine, styrene and styrene derivatives.

The choice of cation will influence the water-dispersibility of the resulting thermoplastic polymer. Monovalent alkali metal ions yield polymers which are less readily dissipated by cold water and more readily dissipated by hot water, while divalent and trivalent metal ions result in polyesters that are not ordinarily easily dissipated by cold water but are more readily dispersed in hot water. It is possible to prepare the sulfo-copolymer using, for example, a sodium sulfonate salt and later by ion-exchange replace this ion with a different ion, for example, calcium, and thus alter the characteristics of the copolymer. In general, this procedure is superior to preparing the polymer with divalent salts inasmuch as the sodium salts are usually more water soluble in the copolymer manufacturing components than are the divalent metal salts. polymers containing divalent and trivalent metal ions are normally less elastic and rubber-like than polymers containing monovalent ions.

Sulfonated addition-type copolymers are more easily dispersed in water and/or form smaller aggregates in dispersion if the sulfonated addition type copolymer has a high charge density. Cationic and anionic copolymers are characterized by their charge density usually expressed in milliequivalents (meq) of anionic or cationic groups per gram of copolymer. Charge densities of sulfonated addition type copolymers suitable in this disclosure are in the approximate range of at least approximately 0.4 meq. and up to approximately to 0.9 meq/g.

Traditional support materials soluble in an alkali bath are difficult to remove. They typically require a hot stirred bath (110 F and higher), a pH of greater than 9, and a long soaking period. It would not be uncommon to soak a finished part/support item for 8-12 hours, depending on geometry, before the support material would begin to degrade. With the use of the inventive formulation, alkaline solution is not required, a hot bath is not required (although it will help accelerate dispersal), and the timeframe for support removal will be less than an hour, and preferably, 15 minutes or less, depending on geometry.

Although the present disclosure has been described with reference to preferred embodiments, workers skilled in the art will recognize that changes may be made in form and detail without departing from the spirit and scope of the disclosure.

What is claimed:

1. A consumable material configured as a configured as a filament feedstockor a toner powder feedstock for use as a soluble support material for printing a 3D part in an additive manufacturing system, the material comprising:
   a water-dispersible sulfonated thermoplastic copolymer, wherein the water-dispersible sulfonated thermoplastic copolymer comprises between 5-50 mol % sodium 4-sulfostyrene as a sulfonated monomer and is a reaction product of an addition-type polymerization of the sulfonated monomer and at least one non-sulfonated monomer, wherein the thermoplastic copolymer comprises a primary chain of monomers and the polymerization of the sulfonated monomer occurs primarily on the primary chain, the water-dispersible sulfonated thermoplastic copolymer being dispersible in tap water resulting in separation of the water-dispersible sulfonated thermoplastic copolymer from the 3D part.

2. The material of claim 1, wherein the at least one non-sulfonated monomer comprises an unsaturated vinyl monomer.

3. The material of claim 1, wherein the at least one non-sulfonated monomer comprises styrene, methyl methacrylate, methyl acrylate, vinyl acetate, vinyl chloride, ethylene, polypropylene, α-olefins, isobutylene, dienes, vinyl chloride, vinylidene chloride, vinyl fluoride, tetrafluoroethylene, vinyl ethers, vinyl esters, acrylic and methacrylic esters, acrylonitrile and any combination of the previously mentioned monomers and their derivatives that are capable of forming copolymers.

4. The material of claim 1, comprising approximately 15 to 35 mole % sulfonated monomer.

5. The material of claim 3, wherein the at least one non-sulfonated monomer is styrene and the copolymer is poly(sodium 4-sulfostyrene-co-styrene).

6. The material of claim 3, wherein the at least one non-sulfonated monomer comprises one or more styrenes selected from the group consisting of chlorostyrene, dichlorostyrene, bromostyrene, dibromostyrene, fluorostyrene, trifluorostyrene, nitrostyrene, cyanostyrene, α-methylstyrene, p-chloromethylstyrene, p-cyanostyrene, p-amino styrene, p-acetoxystyrene, p-styrenesulfonyl chloride, ethyl p-styrenesulfonyl, methyl p-styrenesulfonyl, propyl p-styrenesulfonyl, p-butoxystyrene, p-hydroxystyrene, 4-vinylbenzoic acid, 3-isopropenyl-α,α'-dimethylbenzyl isocyanate and vinylbenzyltrimethylammonium chloride.

7. The material of claim 1, wherein a molecular weight of the copolymer is approximately 50,000-200,000.

8. The material of claim 1, wherein the water-dispersible sulfonated thermoplastic copolymer is substantially amorphous.

9. The material of claim 1, wherein the water-dispersible sulfonated thermoplastic copolymer is at least semi-crystalline.

10. The material of claim 1, characterized by a charge density of at least about 0.4 meq./g, suitable to exhibit water solubility or water-dispersibility without the aid of any other solubility or dispersibility adjuvant.

11. The material of claim 5, wherein a mole ratio of sulfonated monomer to styrene is approximately 35:65, and the copolymer has a glass transition temperature (Tg) of approximately 110° C.

12. The material of claim 1, wherein the water-dispersible sulfonated thermoplastic copolymer is dispersible in tap water in less than 1 hour.

13. A method of 3D printing comprising:
   printing a part from a non-water-dispersible thermoplastic material,
   providing a water-dispersible sulfonated thermoplastic copolymer material configured as a filament feedstock, wherein the water-dispersible sulfonated thermoplastic copolymer comprises between 5-50 mol % sodium 4-sulfostyrene as a sulfonated monomer and is a reaction product of an addition-type polymerization of the sulfonated monomer and at least one non-sulfonated monomer, wherein the thermoplastic copolymer comprises a primary chain of monomers and the polymerization of the sulfonated monomer occurs primarily on the primary chain, and wherein the water-dispersible sulfonated thermoplastic copolymer material has a heat deflection temperature within ±20° C. of the heat deflection temperature of the non-water-dispersible thermoplastic material;
   printing a support structure for the part from the water-dispersible sulfonated thermoplastic copolymer material by heating the feedstock to a melted state and extruding the copolymer material in a series of roads and layers that support the part being printed during the printing process; and
   separating the support structure from the part after the printing is complete by dissolving the water-dispersible sulfonated thermoplastic copolymer material with tap water.

14. The method of claim 13, wherein the at least one non-sulfonated monomer comprises an unsaturated vinyl monomer.

15. The method of claim 13, wherein the at least one non-sulfonated monomer comprises styrene, methyl methacrylate, methyl acrylate, vinyl acetate, vinyl chloride, ethylene, polypropylene, α-olefins, isobutylene, dienes, vinyl chloride, vinylidene chloride, vinyl fluoride, tetrafluoroethylene, vinyl ethers, vinyl esters, acrylic and methacrylic esters, acrylonitrile and any combination of the previously mentioned monomers and their derivatives that are capable of forming copolymers.

16. The method of claim 13 comprising approximatelly 20 to 35 mole % sulfonated monomer.

17. The method of claim 15 wherein the at least one non-sulfonated monomer is styrene, the copolymer is poly (sodium 4-sulfostyrene-co-styrene), and the non-water-dispersible thermoplastic material comprises one or more of ABS, ASA, and PS.

18. The method of claim 15, wherein the at least one non-sulfonated monomer is one or more styrenes selected from the group consisting of chlorostyrene, dichlorostyrene, bromostyrene, dibromostyrene, fluorostyrene, trifluorostyrene, nitrostyrene, cyanostyrene, α-methylstyrene, p-chloromethylstyrene, p-cyanostyrene, p-amino styrene, p-acetoxystyrene, p-styrenesulfonyl chloride, ethyl p-styrenesulfonyl, methyl p-styrenesulfonyl, propyl p-styrenesulfonyl, p-butoxystyrene, p-hydroxystyrene, 4-vinylbenzoic acid, 3-isopropenyl-α,α'-dimethylbenzyl isocyanate and vinylbenzyltrimethylammonium chloride.

19. The method of claim 17, wherein a mole ratio of sulfonated monomer to styrene is approximately 35:65, and the copolymer has a glass transition temperature (Tg) of approximately 110° C.

20. The method of claim 13, wherein the water-dispersible sulfonated addition-type thermoplastic copolymer disperses in tap water in less than 1 hour.

* * * * *